United States Patent
Strizki

[15] 3,637,244
[45] Jan. 25, 1972

[54] LOAD CONCENTRATED BREAKAWAY COUPLING

[72] Inventor: Richard A. Strizki, R.D. #1, Ringoes, N.J. 08551

[22] Filed: Mar. 27, 1970

[21] Appl. No.: 23,207

Related U.S. Application Data

[63] Continuation-in-part of Ser. No. 799,626, Feb. 17, 1969, abandoned.

[52] U.S. Cl. ................................287/129, 52/98
[51] Int. Cl. ......................................F16d 9/00
[58] Field of Search ..............52/98, 99, 296, 298; 285/1, 285/2, 3, 4; 85/62; 287/129, 112, 108

[56] References Cited

UNITED STATES PATENTS

| | | | |
|---|---|---|---|
| 2,282,641 | 5/1942 | Corey | 285/2 |
| 2,305,377 | 12/1942 | Corey | 285/2 |
| 3,499,630 | 3/1970 | Dashio | 52/98 |
| 2,085,074 | 6/1937 | Boyles | 287/108 |
| 3,002,775 | 10/1961 | Mueller et al. | 285/2 X |
| 3,343,322 | 9/1967 | Lurkis | 52/298 |
| 2,249,848 | 7/1941 | O'Brien | 287/108 |
| 3,521,413 | 7/1970 | Scott et al. | 85/61 |

*Primary Examiner*—Andrew V. Kundrat
*Attorney*—Sperry and Zoda

[57] ABSTRACT

Damage to vehicles and posts in traffic accidents is reduced by providing the posts with circumferentially spaced breakaway couplings spaced radially from the axis of the post and located between the base of the post and a stationary support. Fastening means connected to the couplings secure the base of the post to the support and in preferred embodiments of the invention load concentrating elements eccentric to the axis of the fastening means oppose bending of the couplings under normal loads while presenting little or no resistance to bending of the coupling under impact or other forces applied near the base of the post. The couplings have high tensile strength but relatively little resistance to bending and therefore break readily upon impact of a vehicle with the post.

11 Claims, 7 Drawing Figures

INVENTOR:
RICHARD A. STRIZKI

ATTORNEYS:
SPERRY AND ZODA 3,637,244

LOAD CONCENTRATED BREAKAWAY COUPLING

RELATED APPLICATION

This application is a continuation-in-part of applicant's copending application, Ser. No. 799,626 filed Feb. 17, 1969, and now abandoned.

FIELD OF INVENTION

In the interest of traffic safety attempts have been made to provide sign posts, lighting and utility poles and the like with some form of connection with a support which will allow the post to break readily upon impact in any direction so as to reduce the damage to a vehicle and its passengers in the event of a collision while causing a minimum of damage to the post and the sign, light, wires or the like supported thereby.

Various types of frangible posts or connections have been designed for this purpose heretofore. However, the frangible means employed in such construction have generally served to weaken the posts to such an extent that the size or weight of the load which may be supported by the post is limited.

In accordance with the present invention, posts, columns and similar members used to support signs, lights, wires and the like are provided with an assembly including breakaway couplings for securing the base of the post to a support. The elements of the preferred assembly are so constructed and arranged that they serve to develop forces which oppose or neutralize forces which tend to cause the coupling to bend under normal loading such as wind pressure applied to the post at points located a substantial distance above the base and breakaway couplings of the post. At the same time the assembly is so constructed that only limited opposing forces, if any, are developed when the post is subjected to impact or other forces applied to the post at points located relatively close to the base and support. As a result the couplings will be subjected to severe bending on vehicle impact whereupon the couplings will break and release the post from its support.

THE DRAWINGS

PREFERRED EMBODIMENTS OF THE INVENTION

Figure 1:
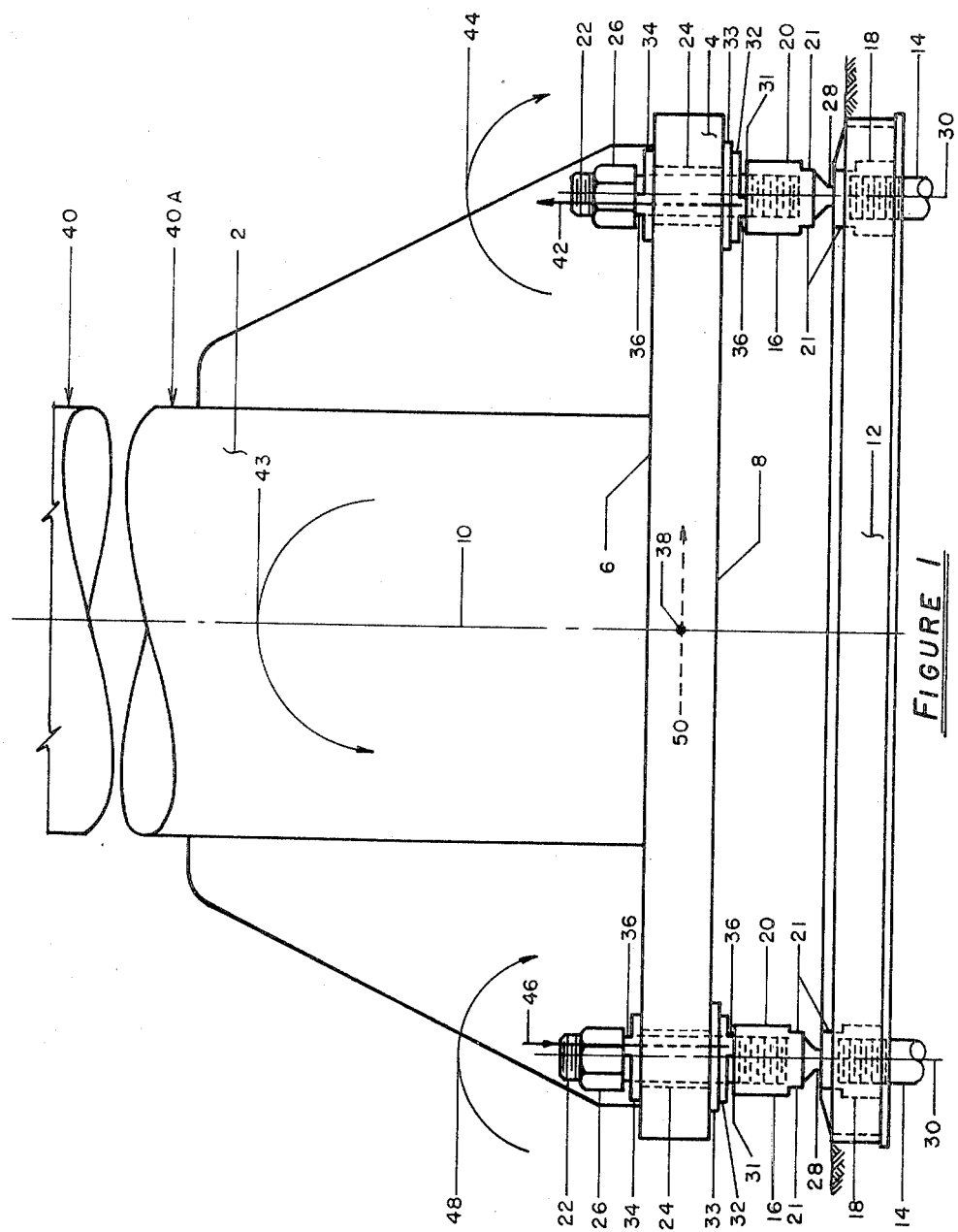
FIG. 1 is a vertical sectional view through the base portion of a typical assembly embodying the present invention.
Figure 2:
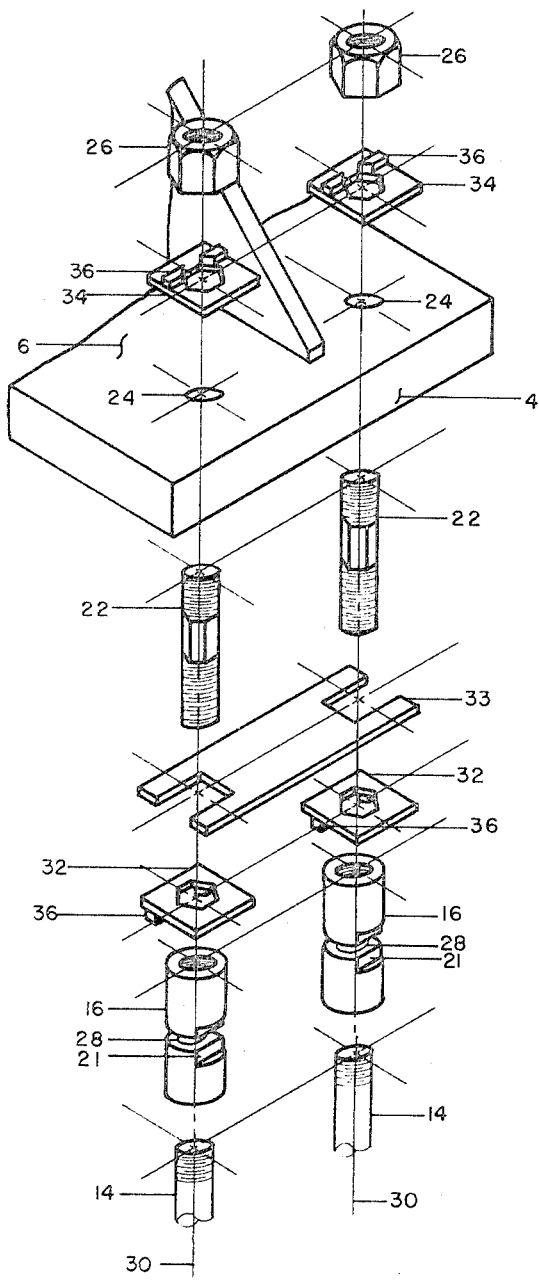
FIG. 2 is an exploded view of the elements employed in the assembly of FIG. 1.

In that form of the invention chosen for purposes of illustration in FIGS. 1 and 2 of the drawings the post 2 is mounted on or secured fixedly to a base 4 presenting a flat upper surface 6 and a flat lower surface 8. The post is preferably mounted in an upright position so that its vertical axis 10 will be substantially at right angles to the base 4. The lower surface 8 of the base is spaced from a support or foundation 12 in which anchor bolts 14 are fixed or embedded. The post 2 may support a sign, light, utility lines or the like and may be of any desired cross section and height. The post further may be formed of wood, aluminum, steel or any other suitable material and the foundation 12 may be formed of concrete, dirt, wood or the like or may be the deck of a ship, the bed of a vehicle or any other support.

Within the space between the lower surface 8 of the base 4 of the post and the upper surface of the foundation 12 are located breakaway coupling members 16. These members as shown are in the form of generally cylindrical pieces of material having a high tensile strength but possessing relatively little resistance to bending as compared to conventional fastening means heretofore used for mounting posts. A typical material adopted for use in forming the coupling member 16 is an alloy steel having a tensile yield strength of about 165,000 p.s.i. or more.

The coupling members 16 are provided with threaded connections at the opposite ends thereof and for this purpose the lower end 18 of each member 16 may have an internally threaded recess for receiving the threaded upper end of one of the anchor bolts 14. In a similar way the upper end 20 of each member 16 may have an internally threaded recess for receiving the lower end of a stud 22 which extends through a hole 24 in the base 4 of the post. A nut 26 is applied to the upper end of each stud 22 for securing the post in place. The portions of the coupling members 16 between the upper and lower ends thereof are each provided with a zone of weakness such as the neck 28 having a reduced cross-sectional area. The zones of weakness 28 of all of the coupling members 16 are preferably located in a horizontal plane or at other points between the lower surface 8 of the base of the post and the upper surface of the support or foundation 12 and are preferably positioned with the vertical axes 30 of the couplings parallel to the vertical axis 10 of the post 2.

Any suitable number of coupling members may be employed and they are arranged at points spaced radially from the vertical axis 10 of the post 2 and spaced circumferentially from each other. For most purposes it is preferable to provide three or more breakaway members disposed circumferentially about the base of the post. The coupling members 16 receive and support the vertical load of the post 2 and whatever sign or object is connected to the post. The number of coupling members the cross-sectional area and tensile strength of the members 16 at their zones of weakness 28 should therefore be selected or designed to carry the expected loads which will be applied to the post (with a suitable factor of safety).

In that form of the invention illustrated in FIGS. 1 and 2, the upper ends 32 of the coupling members 16 are flat and lie in a horizontal plane located between the lower surface 8 of the base 4 of the post 2 and the upper surface of the support or foundation 12. The coupling members are employed in combination with means for applying a concentrated load to the coupling members upon the application of forces to the post 2 and base 4 which tend to tilt the post out of its normal vertical position. The means shown for this purpose are in the form of washers 34 which surround the stud 22 and are provided with projections or load concentrating elements 36. These load concentrating elements are positioned between the vertical axis 30 of the studs 22 of the coupling members 16 and the vertical axis 10 of the post 2. The load concentrating element 36 which is carried by the washers 32 located adjacent the lower surface 8 of the base 4 of the post, extends downwardly into contact with the flat upper end 31 of the coupling member with which it is associated. On the other hand the load concentrating element 36 carried by the washer 34 located adjacent the upper surface 6 of the base 4 extends upwardly into contact with the nut 26 on the upper end of the stud or fastening means 22. The points on upper end 20 of the coupling member 16 and on the lower surface of nut 26 against which the load concentrating elements 36 bear are thus located eccentrically with respect to the vertical axis 30 of the coupling member 16 and fastening means or studs 22. The flat vertical surfaces 21 of the coupling 16 are used as wrenching flats when installing or removing the coupling. Part 33 which is presented in the form of a wrench is used to hold the washer 34 in the proper position during installation and to prevent rotation of the studs 22.

The assembly thus provided and located on the right-hand side of the vertical axis 10 of the post 2 as shown in FIG. 1 is duplicated by a corresponding assembly located on the left-hand side of the vertical axis 10 in FIG. 1. Accordingly, when the post 2 is tilted by a wind load or other force to the right or left from its normal position in which the axis 10 of the post extends vertically, the base 4 of the post will tend to tilt with the post about the point 38 at the intersection of the axis 10 with the base 4. As a result, the load concentrating elements 36 on the washers 32 and 34 will move with the base and serve to cause a force to be applied eccentrically to the coupling members and associated fastening means tending to cause the coupling members 16 to tilt to one side or the other from the vertical axis 30 of the coupling member.

Thus, when the post 2 is subjected to a normal horizontally directed force, represented by the arrow 40, such as a wind load for example, the post 2 and its base 4 will tend to tilt in a counterclockwise direction about the point 38 as seen in FIG. 1, as indicated by the arrow 43. The load concentrating element 36 on the washer 34 on the upper face 6 of the base at the right-hand side of the assembly will then be urged upwardly applying a vertically directed force against the nut 26 on fastening means 22 as represented by the arrow 42. However, since the force 42 is applied eccentrically with respect to the axis 30 on the inner side of the axis there will be a tendency for the fastening means 22 and its associated coupling member to be bent to the right at the zone of weakness 28 and in a clockwise direction as indicated by the arrow 44 in FIG. 1. At the same time tilting of the base 4 will serve to urge the load concentrating element 36 on the washer 32 positioned adjacent the lower surface 8 of the base of the left-hand side of FIG. 1 to bear forcibly downward against the upper surface 31 of the coupling member 16 at the left side of the assembly. This force is represented by the arrow 46 and is applied directly to the coupling member 16 on the left-hand side of the assembly. Since the force 46 is directed vertically downward at a point eccentric to and on the inner side of its axis 30, of the left-hand coupling member it tends to cause the coupling member to be bent to the right about its zone of weakness 28 and in a clockwise direction as seen in FIG. 1 and as indicated by arrow 48.

Since the assembled fastening means and coupling members on both sides of the base 4 are subjected to forces which tend to bend them toward the right under the conditions described above and as represented by arrows 44 and 48, there will be a tendency for the post 2 and its base 4, to be moved bodily and horizontally from left to right in response to such applied forces and as represented by the dotted arrow 50. On the other hand, the wind or other force represented by the arrow 40 applied to the post tends to move the post and its base bodily and horizontally in a direction opposite to the arrow 50 and to rotate the post counterclockwise as represented by arrow 43. Since the rotation represented by the arrows 43 and 48, 44 are applied in opposite directions they therefore oppose each other and may completely counterbalance each other so that the coupling members 16 are not actually bent at all, or are caused to bend to only a minimal extent about their zones of weakness 28. As a result the breakaway couplings will not be broken upon the application of wind loads or other normally anticipated forces which may be applied to the post and the construction carried thereby.

In order to assure such counterbalancing or oppositions of the forces applied to the post and the coupling members under normal or anticipated load conditions, the construction is so designed that the spacing of the coupling member 16 and fastening means 22 from the vertical axis 10 of the post 2 and the eccentricity of the load concentrating elements 36 from the vertical axis 30 of the fastening members will develop rotation of sufficient magnitude to withstand and compensate for any anticipated loading 40 in either direction which may be applied to the post at a predetermined or desired elevation, say 8 or 20 feet, above the foundation or support for the post.

The situation presented upon impact of a vehicle with a post differs from that presented by normal or anticipated loading in that the impact force 40A is generally applied to the post at a point which is only about 18 inches to 2 feet above the ground line or foundation 12 upon which the post is supported and only about the same distance above the point 38 about which the post 2 and its base 4 will be tilted. The lever arm through which the horizontal force 40A is applied to tilt the base 4 on impact will then be only about 18 inches to 2 feet whereas the lever arm through which the normal wind loading or force 40 is applied to the base 4 of the post will be much greater and as indicated above, may be 8 or 20 feet or more.

The length of the lever arm is directly related to the designed eccentricity of the load concentrating section 36 to the axis 30 for the normal load 40 and therefore produces no tilting at the zone of weakness 28. The application of load 40A near the base cannot be satisfied by this eccentricity and as a result the opposing rotation produced by forces 42 and 46 on the post 2 under impact will not balance the bending produced by force 40A. The post and its base 4 will therefore be bodily moved to the left as seen in FIG. 1 and the breakaway couplings 16 will be sharply bent at their zones of weakness 28. The couplings 16 will then break and release the post from its foundation so that it will move readily and damage to the vehicle and its passengers will be greatly reduced. At the same time the only parts of the post assembly which need be replaced to restore the post to its original erect position are the coupling members 16 which are relatively inexpensive.

Figure 3:
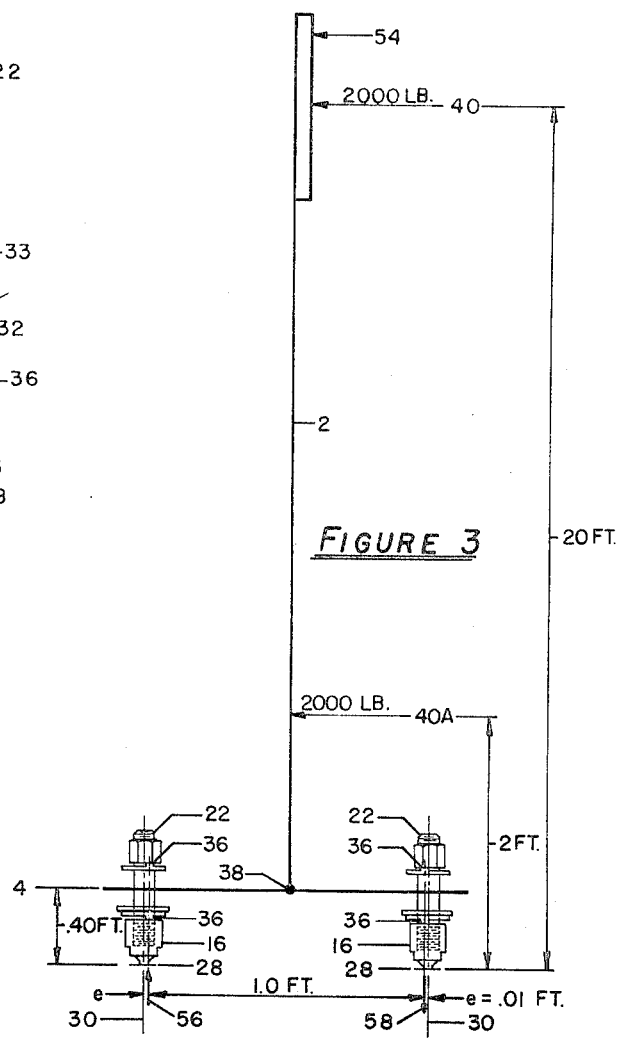
FIG. 3 is a diagrammatic illustration indicating the manner in which forces are applied to the elements of the assembly under normal and impact conditions.

In order to illustrate diagrammatically the contrasting conditions presented under normal loading and impact loading on a post, reference is made to FIG. 3 of the drawings. As there shown it is assumed that a horizontal wind force of 2,000 pounds is applied to a sign 54 supported on the post 2 at an elevation of 20 feet above the zone of weakness 28. The post will then tend to tilt about the point 38 and will exert a bending moment of 2,000×20 or 40,000 foot pounds at the zone of weakness. Such tilting of the base will be applied through the load concentrating elements 36 to the coupling members 16 and fastening means 22 as vertically directed forces represented by the arrows 56 and 58. The forces 56 and 58 are applied in opposite directions and at points 36 of the washers and spaced inwardly from the vertical axis 30 of the coupling members by the distance $e$ which for purposes of calculation may be 0.01 foot. Further it may be assumed that there are four coupling members positioned a foot apart at diametrically opposite points in the assembly. In the present example the bending moment of 40,000 foot pounds will be reacted as 40,000/1×220,000 pounds on each coupling and will be applied to the couplings at a distance of 0.01 foot from its vertical axis 30 of the coupling. The resulting rotation applied to the coupling members tending to rotate the base 4 to the right will then be 20,000×0.01=200 foot pounds per coupling. The applied load 40 of 2,000 pounds is assumed equally distributed between the four couplings and therefore the load per coupling is 2,000/4=500 pounds. If the distance from point 38 of the base to the zone of weakness is assumed to be 0.40 feet, the counterclockwise rotation produced by this force on the zone of weakness of the coupling will be equal to 500×0.40= 200 foot pounds. The rotation thus being equal and opposite in direction will produce no tilting movement at the zone of weakness 28 of the coupling members 16 and the couplings will not be bent or broken.

The situation presented upon impact of a vehicle against the post 2, assuming an impact force of 2,000 pounds, is also represented in FIG. 3. As there shown it is assumed that the impact force 40A is applied to the post 2 at a point 2 feet above the zone of weakness 28 resulting in 2×2,000 pounds or 4,000 foot pounds. The compensating rotation from the concentrating elements 36 of the washer then is equal to 4,000/1×2×0.01=20 foot pounds per coupling tending to move the post and base 4 to the right or clockwise. The applied impact load of 2,000 pounds divided equally between the four couplings is still 500 pounds. The counterclockwise rotation produced at the zone of weakness by this force is still 500×0.40=200 foot pounds, leaving an unbalance of 200−20=180 foot pounds. The post 2 and its base 4 will therefore be forcibly thrust to the left and the coupling members 16 will be sharply bent at their zones of weakness 28. As a result the couplings 16 will break releasing the post from its support so that it will move readily upon impact.

It will be apparent that the amount of rotation developed in any particular assembly will depend upon the eccentricity or spacing *e* of the load concentrating elements 36 from the vertical axis 30 of the coupling members 16 and fastening means 22 and from the horizontal distance between couplings as well as the vertical distance of the zones of weakness 28 of the coupling members from the load concentrating elements 36. However, these various dimensions can be set and established to meet any anticipated conditions of normal and impact loading desired. In actual practice it has been found that five washers with load concentrating elements located at different distances from the axis 30 are generally sufficient to meet most anticipated conditions. Similarly, the coupling members may be provided in different sizes and dimensions if desired and the shape and construction thereof and the manner in which they are applied and secured to the post and its foundation can be varied.

It should be understood that in most assemblies it is necessary to provide for possible impact loading of the post in any direction and in many cases wind loading or other normal and anticipated loading may be applied in different directions. It is therefore usual to locate the breakaway couplings at various circumferentially spaced points about the vertical axis of the post—three and preferably four or more breakaway couplings being used in most assemblies.

Figure 5:
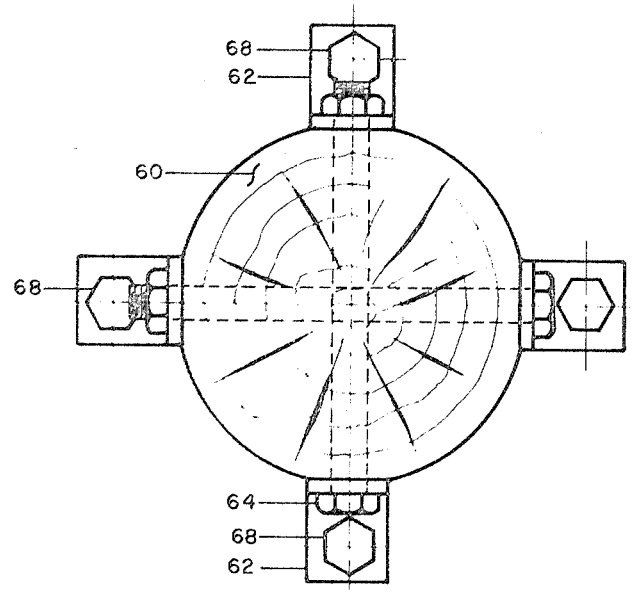
FIG. 5 is a plan view of the construction shown in FIG. 4.
Figure 4:
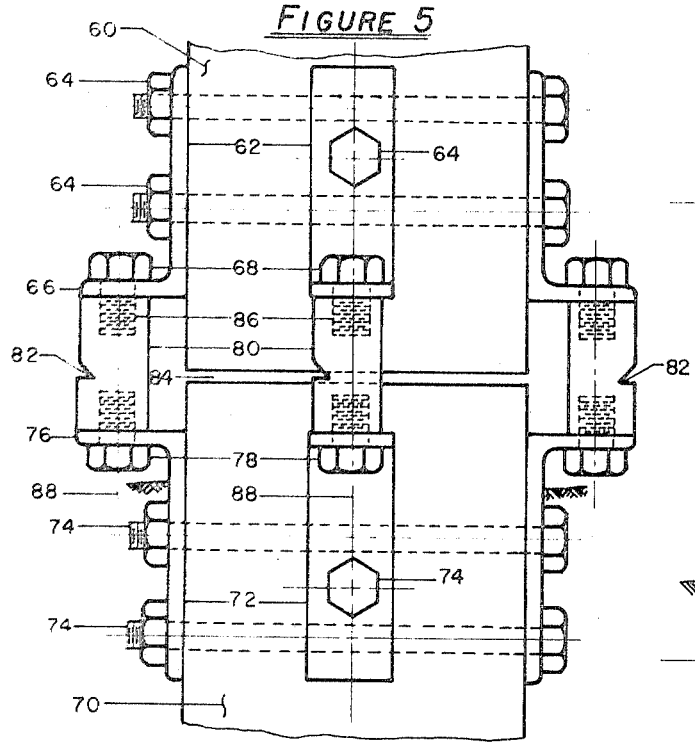
FIG. 4 is a side elevation of an alternative assembly embodying the present invention.

The present invention may also be secured to a post and its support in arrangements differing from those shown in FIGS. 1 and 2 and it is not always necessary to use the washer with the load concentrating elements of those assemblies. Thus as shown in FIGS. 4 and 5 a post 60 may be provided with L-shaped brackets 62 secured to the post by screws or bolts 64 at spaced points about the post. The lower ends 66 of the brackets project radially outward from the post to receive upper fastening means 68. The support or foundation for the post 60 may consist of a lower post section 70 or the like which is sunk in the ground or otherwise fixed in place. The support 70 is then provided with similar L-shaped brackets 72 secured to the lower post section or support by bolts 74 or the like. The upper ends of the brackets 72 are turned outward at 76 to receive lower fastening means 78.

Breakway coupling members 80 are positioned between the outwardly turned lower end 66 of the brackets 62 carried by post 60 and the outwardly turned upper ends 76 of the brackets 72 secured to the support 70. The breakaway couplings are formed of suitable material having high tensile strength but limited resistance to bending and are provided with zones of weakness 82 which are preferably portions of reduced cross-sectional area. The lower end of the post 60 and the upper end of the support 70 may be spaced apart a short distance to establish a plane of separation 84 between the post and its support and the zones of weakness 82 are preferably located in the plane 84.

The coupling members 80 are provided with threaded connections 86 at their upper ends for receiving the fastening means 68 passing through the outwardly projecting lower ends 66 of the upper brackets 62 whereas the lower ends of the couplings are threaded to receive the fastening means 78 extending through the outwardly projecting upper ends 76 of the brackets 72 mounted on the support 70.

The construction thus provided is adapted for use in those installations wherein the normal or anticipated horizontal loading of the post is of lesser magnitude and substantially less then than the anticipated impact loading. The assembly is nevertheless designed in such a manner that there will be adequate strength and resistance to breakage of the coupling members upon normal or anticipated loading of the post at points spaced a substantial distance above the plane of separation 84 while offering insufficient resistance to bending and breaking of the coupling members 80 at their zones of weakness 82 upon impact of a vehicle or the application of large horizontal forces to the post at an elevation of two feet or so above the zone of weakness of the coupling members.

Further as illustrated in FIG. 4 the coupling members need not necessarily be symmetrical in shape with respect to the vertical axis 88 thereof but may be provided instead with a recess or cut in the outer side only thereof or be otherwise formed to allow the fasteners to break upon excessive bending thereof.

Figure 7:
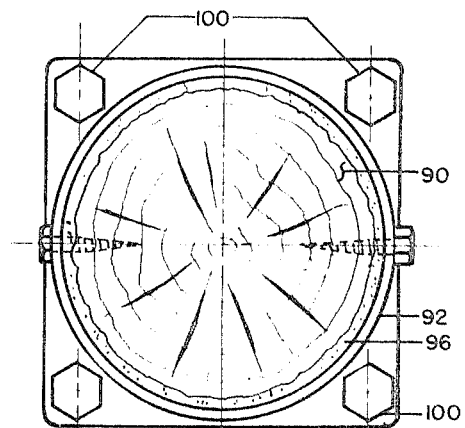
FIG. 7 is a plan view of the construction shown in FIG. 6.
Figure 6:
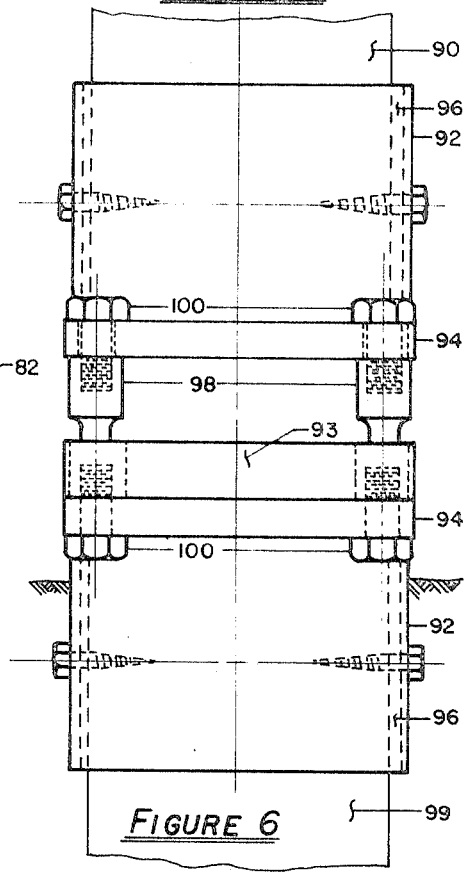
FIG. 6 is a side elevation of a further alternative construction embodying the present invention.

In that form of the invention shown in FIGS. 6 and 7 the post 90 has the lower end thereof slipped into a tubular device 92 fixedly secured to a horizontal base member 94. The space between the post and the inner walls of the tube 92 can then be filled with a suitable hardenable material 96 which will serve to hold the post rigidly in place with respect to the base 94. In this way it is possible to use wooden or other posts which are not accurately trimmed, sized, or shaped to fit closely within the tubular member 92 secured to the base member 94 of the assembly. It will then only be necessary to provide a few selected shapes or sizes of tubular members for use in erecting a wide range in sizes, shapes and types of posts. The construction and arrangement of the support or foundation 99 and of coupling members 98 and fastening means 100 used in the assembly may then be the same or similar to those shown in FIGS. 1 or 4. A spacer 93 may be located between the bases 94 of the post and its foundation to present an upper surface on a plane including the zones of weakness of the coupling members to provide a surface across which the broken coupling members may move in the event of impact or the like. The members 92 and 94 then will not be damaged and resistance to movement of the post upon breakage of the couplings will be reduced. Furthermore, the assembly of FIGS. 4 to 7 may be designed and used with or without the eccentric load concentrating elements of FIGS. 1 and 2 depending upon the particular conditions of use and the anticipated amount and direction of the various forces which may be applied to the post.

I claim:

1. In combination with a post having a vertical axis, a base fixedly secured to said post, a support for the post, a plurality of breakaway coupling members each having a vertical axis extending generally parallel to the axis of said post, said coupling members each having a zone of weakness between the upper and lower ends thereof located in a horizontal plane between the base of said post and said support, said coupling members further being spaced radially from the axis of said post and spaced circumferentially from each other, fastening means connected to the upper end of each coupling member and to the base of said post other fastening means connected to the lower end of each coupling members and to said support, and means operable to apply substantially equally opposed balanced bending forces to said coupling members at their zones of weakness upon the application of a transverse load to an upper portion of said post and to apply unequally opposed unbalanced bending forces to said coupling members at their zones of weakness upon the application of transverse loads to a lower portion of said post.

2. The combination as defined in claim 1 wherein the base of said post is spaced vertically from said support and said coupling members are located in the space between said base and support.

3. The combination as defined in claim 1 wherein said coupling members support the vertical load of said post.

4. The combination as defined in claim 1 wherein said breakaway coupling members have relatively high tensile strength as compared to their resistance to bending.

5. The combination as defined in claim 1 wherein the zones of weakness of the coupling members are portions of the coupling members which are of reduced cross-sectional area.

6. The combination as defined in claim 1 wherein means are movable with the base of said post to engage said coupling members at points between the axes of said coupling members and the axis of said post for applying forces to said coupling members at points located eccentric to the vertical axes of the coupling members upon tilting of the post and its base.

7. The combination as defined in claim 6 wherein the means movable with the base of said post each present a fulcrum about which the coupling member is movable.

8. The combination as defined in claim 1 wherein the fastening means connected to the coupling members and the base of the post are connectors which pass through holes in the base of the post and have nuts carried thereby and located above the base of said post, load concentrating elements are located between said nuts and the upper surface of said base and other load concentrating elements are located between the coupling members and the lower surface of the base of said post, all of said load concentrating elements being located between the vertical axis of the coupling members and the axis of said post.

9. The combination as defined in claim 8 wherein said load concentrating elements are carried by washers surrounding said connectors and movable with the base of the post, the load concentrating elements each consisting of means projecting from said washer and positioned eccentrically with respect to the vertical axis of said coupling member.

10. The combination as defined in claim 8 wherein means engaging the breakaway coupling serve to prevent circumferential displacement of said load concentrating elements with respect to the vertical axes of the studs and coupling members.

11. Breakaway coupling means for use in the erection of a post comprising the combination of a member having a longitudinal axis, means concentric with said axis at the opposite ends of said member for attachment of fastener means to the member, said member having a portion of reduced cross section concentric with and located between the opposite ends thereof, and load concentrating means engaging said member on one end face thereof at a point eccentric to the longitudinal axis of said member, and wherein said load concentrating means is carried by an element surrounding a fastener attached to one end of said coupling member.

* * * * *

Disclaimer and Dedication 3,637,244.—*Richard A. Strizki*, Ringoes, N.J. LOAD CONCENTRATED BREAKAWAY COUPLING. Patent dated Jan. 25, 1972. Disclaimer and dedication filed Oct. 18, 1974, by the assignee, *The State of New Jersey*.

Hereby disclaims and dedicates to the Public the remaining term of said patent.

[*Official Gazette July 8, 1975.*]